United States Patent [19]

Mochida et al.

[11] 4,326,617
[45] Apr. 27, 1982

[54] CLEARANCE ADJUSTING DEVICE

[75] Inventors: Haruo Mochida, Yokohama; Tetsuo Kobayashi, Ikeda, both of Japan

[73] Assignee: Nissan Motor Company, Limited, Tokyo, Japan

[21] Appl. No.: 150,622

[22] Filed: May 16, 1980

[30] Foreign Application Priority Data

Jul. 16, 1979 [JP] Japan .................. 54-90069

[51] Int. Cl.³ ............................................ F16D 13/75
[52] U.S. Cl. ................................................ 192/111 B
[58] Field of Search ........... 192/111 B, 111 A, 111 R, 192/111 T, 110 R, 8 C, 99 R, 99 A, 99 S, 70.25; 74/501 R, 489

[56] References Cited

U.S. PATENT DOCUMENTS

| | | | | |
|---|---|---|---|---|
| Re. 16,565 | 3/1927 | Myers | ................................. | 192/8 C |
| 3,146,868 | 9/1964 | Lang | .................... | 192/8 C |
| 3,901,363 | 8/1975 | DeGrazia | ................ | 192/110 R |
| 3,916,723 | 11/1975 | Hawtree et al. | ................. | 74/501 R |
| 4,261,221 | 4/1981 | Kobayashi | ...................... | 74/501 R |
| 4,263,998 | 4/1981 | Moriya | ............................... | 74/501 R |

Primary Examiner—George H. Krizmanich
Attorney, Agent, or Firm—Lane, Aitken, Kice & Kananen

[57] ABSTRACT

A device for adjusting a clearance between a certain member and another member, includes a first elongate member such as an outer cable of a clutch system, a locking coil member having a pair of bent portions at its ends which is wound around a male screw portion of the first member, a second member such as a nut provided with a female screw portion screwed with the male screw portion of the first member and a notched portion formed in the second member, and control means such as a ring which is movable in its rotational and axial directions in relation to the second member within a limited range. The control means is operated to control the rotation of the second member so that the locking coil member is loosened from or tightly locked on the male screw portion of the first member depending on a position of the control means in relation to the second member.

11 Claims, 7 Drawing Figures

CLEARANCE ADJUSTING DEVICE

BACKGROUND OF THE INVENTION

This invention relates to an adjusting device through which a predetermined clearance can be set easily and accurately between a certain member and another member. For example, such a clearance adjusting device may be applied to a control cable of normally non-contacting type clutch system for an automotive vehicle.

FIG. 1 shows a conventional normally noncontacting type clutch system. A cable guide 13 with a long through hole 13b is fixed on a portion of a vehicle body 16 by a bolt 30. One end of an outer cable 10 is fixed to a clutch housing 1, and the other end of the cable 10 has a male screw portion 11 to be screwed with a double nut 12. The male screw portion 11 penetrates through the cable guide 13 in its longitudinal direction. An inner cable 4 is connected at its one end to the upper end of a clutch pedal 14. The other end thereof is connected to the upper end of a withdrawal lever 2.

In the above-stated clutch system, when the clutch pedal 14 is kicked down in a well know manner, the inner cable 4 is pulled along the outer cable 10 to rotate the withdrawal lever 2 around a pivot 2a counter-clockwise in FIG. 1. Thus, a release bearing 3 presses the central portion of a diaphragm 5 to release a facing 6 from a flywheel 9. In order to arrange the facing 6 in position in relation to the flywheel 9, a predetermined clearance A between the withdrawal lever 2 and the release bearing 3 must be set. The rotation amount of the clutch pedal 14 changes due to a stretch of the inner cable 4 and the wear of the facing 6. Therefore, a clearance must be often adjusted so that each member can work accurately. For such an adjusting purpose, the double nut 12 is usually used. In such a case, a clearance A' is set between the cable guide 13 and the double nut 12 after a power portion 2b of the withdrawal lever 2 is pressed onto the release bearing 3 with no clearance therebetween, for example, by inserting a gauge of a given thickness between the double nut 12 and the cable guide 13. However, such a setting operation is cumbersome. The double nut 12 can be set by one's eye measurement, but inaccuracy often occurs. Another disadvantage is that the double nut 12 may be loosened by its vibration. An E-ring can be used for the clearance adjusting purpose, but it is formed with some grooves so that an optimum clearance can not easily be set.

SUMMARY OF THE INVENTION

The object of this invention is to provide an adjusting device wherein an accurate clearance can be easily set without any additional tools.

A device for adjusting a clearance between a certain member and another member, includes a first elongate member such as an outer cable of a clutch system, a locking coil member having a pair of bent portions at its ends which is wound around a male screw portion of the first member, a second member such as a nut provided with a female screw portion screwed with the male screw portion of the first member and a notched portion formed in the second member, and control means such as a ring which is movable in its rotational and axial directions in relation to the second member within a limited range. The control means is operated to control the rotation of the second member so that the locking coil member is loosened from or tightly locked on the male screw portion of the first member depending on a position of the control means in relation to the second member.

DESCRIPTION OF A PREFERRED EMBODIMENT

Figure 2:
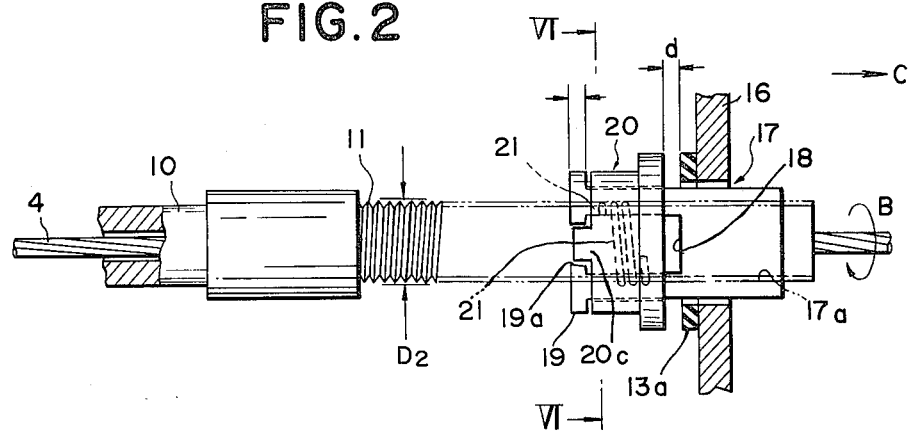
FIG. 2 shows an adjusting device according to the invention, partly in section.
Figures 3, 4:
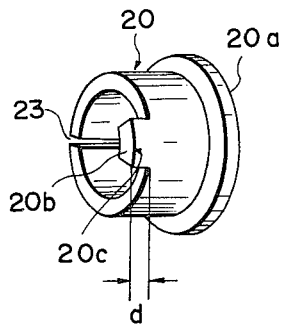
FIG. 3 is a perspective view of a ring for use in the adjusting device as shown in FIG. 2.
FIG. 4 is a perspective view showing a locking coil for use in the adjusting device as shown in FIG. 2.
Figure 5:
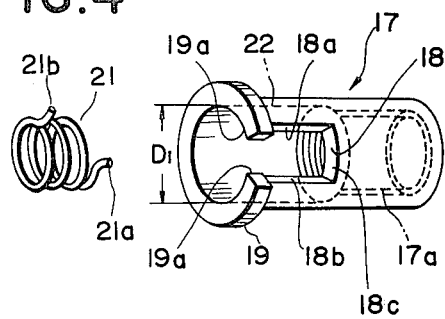
FIG. 5 is a perspective view showing a nut for use in the adjusting device as shown in FIG. 2.

Referring now to FIGS. 2 through 7, a clearance adjusting device according to a preferred embodiment of the present invention includes a first member such as an outer cable 10 of a normally non-contacting type clutch system with a male screw portion 11 at one end thereof. A nut 17 is a typical example of a second member. As FIG. 5 shows, the nut 17 includes a female screw portion 17a to be screwed with the male screw portion 11, a notched portion 18 in a rectangular opening form, and a flange-like stopping portion 19 which has a space between the opposite ends 19a. The notched portion 18 is formed at a collar portion 22 of the nut 17. The inner diameter $D_1$ of the collar portion 22 is larger than the outer diameter $D_2$ of the male screw portion 11. A locking coil spring 21 is formed such that it can be screwed with the male screw portion 11 as shown in FIGS. 2 and 4. Both ends 21a, 21b of the locking coil spring 21 are bent outwardly. The length of each bent end 21a, 21b of the coil spring 21 is slightly less than the thickness of the collar portion 22 of the nut 17. Both bent ends 21a, 21b of the locking coil 21 are located within the notched portion 18 of the nut 17 when the locking coil spring 21 is properly wound around the male screw portion 11 of the outer cable 10. A clearance a is set between one side portion 18a of the notched portion 18 and one bent end 21b of the locking coil spring 21 while a clearance a' is set between the opposite side portion 18b of the notched portion 18 and the other bent end 21a.

Figure 6:
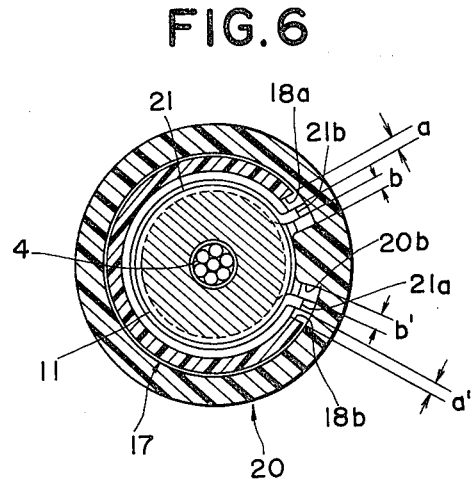
FIG. 6 is a sectional view taken along the line VI—VI in FIG. 2.
Figure 7:
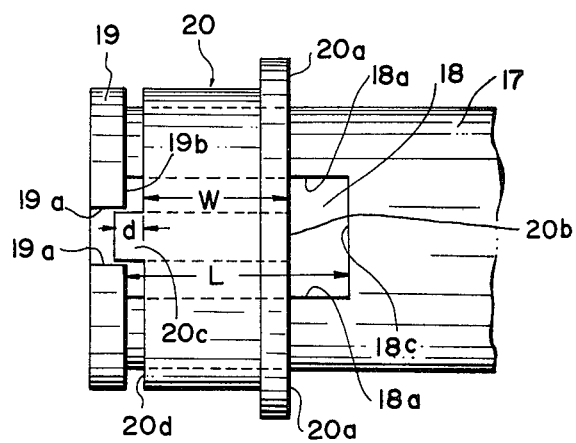
FIG. 7 is an enlarged view of part of the adjusting device shown in FIG. 2.

As shown best in FIG. 3, a third member is control means such as a ring 20 with a slit 23 formed in its longitudinal direction. The ring 20 is made of a resilient material such as a synthetic resin, so that the ring 20 can be enlarged in diameter if desired. The ring 20 is fitted on the nut 17. As shown in FIG. 6, the ring 20 is provided at its end with a projection 20b protruding inwardly from the inner surface of the ring 20 which is located within the notched portion 18 of the nut 17. The projection 20b is positioned between the pair of bent ends 21a and 21b of the coil spring 21 so that the bent ends 21a, 21b are positioned apart from the side surfaces of the inward projection 20b of the ring 20 by the clearances b, b', respectively. When the ring 20 is rotated relative to the outer cable 10, either of the bent portions 21a, 21b comes into engagement with the inward projection 20b so that the coil spring 21 is enlarged so as to be loosened from the male screw portion 11 of the outer cable 10. The ring 20 further has a projection 20c of a length d in its axial direction on one end thereof which is to be positioned between the opposite ends 19a, 19a of the stopping portion 19. As shown in FIG. 7, the distance L between the backside 19b of the stopping portion 19 and the rear side 18c of the notched portion 18 is slightly longer than the width W of the ring 20 and the length d of its axial projection 20c. Thus, unless the axial projection 20c of the ring 20 contacts the opposite ends 19a of the stopping portion 19, the ring 20 can move freely in its rotational and axial directions relative to the nut 17 within a limited range. After the axial projection 20c of the ring 20 comes into engagement with either of the opposite ends 19a, 19a of the stopping portion 19, the ring 20 is rotated together with the nut 17 in such a way that either of the opposite side portions 18a of the notched portion 18 contacts the bent end 21a or 21b of the coil spring 21 so as to tighten the coil spring 21. As a result, the ring 20 and the nut 17 are prevented from rotating any more. At that time, the backside 19b of the stopping portion 19 is set apart from the backside 20a of the ring 20 by the distance of d plus W. The ring 20 moves further in its axial direction until the backside 19b of the stopping portion 19 contacts the front side 20d of the ring 20.

The adjusting device as above-stated is assembled as follows. The resilient ring 20 with the slit 23 is enlarged in diameter, and then the nut 17 is inserted into the ring 20 until the inward projection 20b is fitted in the notch 18 of the nut 17. On the other hand, the locking coil spring 21 is wound in position around the male screw portion 11 of the outer cable 10. Thereafter, the nut 17 together with the ring 20 is screwed with the male screw portion 11 of the outer cable 10 so that the bent ends 21a, 21b of the locking coil 21 are set between the inward projection 20b of the ring 20 and the side portions 18a and 18b of the notch 18 of the nut 17 with the clearances a, a', b, b', respectively, as shown in FIG. 6.

Figure 1:
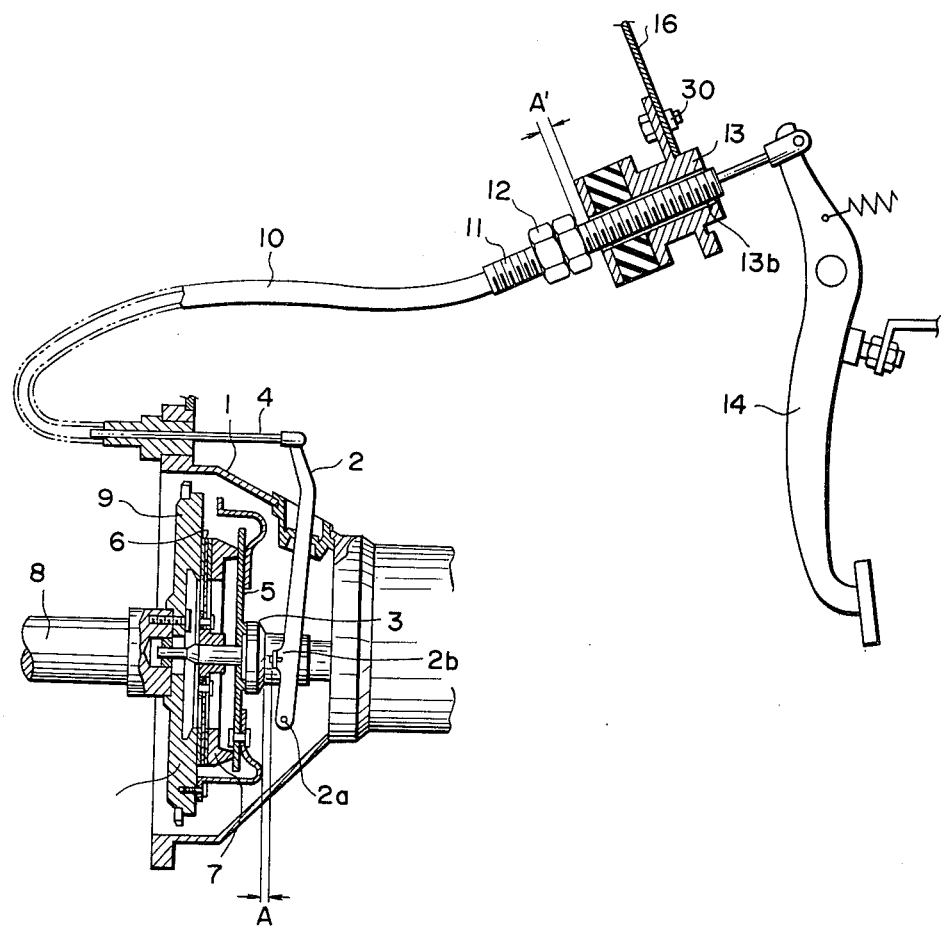
FIG. 1 shows a conventional normally noncontacting type clutch system.

The adjusting device according to the present invention is operated as follows. For example, the adjusting device can be applied to a clutch system for a car vehicle as shown in FIG. 1. One end of the inner cable 4 is connected to the upper end of the clutch pedal 14 while the other end thereof is connected to the upper end of the withdrawal lever 2. While the withdrawal lever 2 is pressed onto the release bearing 3 so that no clearance exists therebetween, the ring 20 is rotated by a hand, for example, in the direction B in FIG. 2 so that the inward projection 20b engages the bent end 21a of the locking coil 21 so as to enlarge the locking coil 21 whereby the nut 17, ring 20 and locking coil 21 can together rotate and move along the male screw portion 11 of the outer cable 10 in the direction C. After the rear end 20a of the ring 20 contacts the member 13a fitted on the vehicle body 16, the axial projection 20c of the ring 20 comes into contact with the stopping portion 19 of the nut 17. At this time, the distance between the backside 19b of the stopping portion 19 and the member 13a is d plus W, that is, the length of the axial projection of the ring 20 plus the width of the ring 20. When the axial projection 20c of the ring 20 engages either of the opposite ends 19a of the stopping portion 19, either of the opposite side portions 18a, 18b engages the bent portion 21a or 21b of the coil in place of the inward projection 20b of the ring 20 so that the locking coil 21 is tightly locked on the male screw portion 11 of the outer cable 10, thus the nut being prevented from further rotating. After the inner cable 4 is properly connected to the pedal 14, the ring 20 is moved in the direction opposite to the direction C until the backside 19b of the stopping portion 19 contacts the front end 20d of the ring 20. As a result, a clearance d is accurately set between the ring 20 and the member 13b as well as between the withdrawal lever 2 and the release bearing 3.

What is claimed is:

1. A device for adjusting a clearance between a certain member and another member, comprising:

a first elongate member having a male screw portion thereon;

a second elongate member having a female screw portion screwed with the male screw portion of the first member, an elongate notch formed in its axial direction, and a stopping portion provided in cooperation with the notch;

a locking coil member wound around the male screw portion of the first member, said locking coil member having a pair of outwardly bent portions set in the notch of the second member; and control means fitted onto the second member so as to be movable relative to the second member within a limited range between positions in which the control means does not engage the stopping portion of the second member and a position in which the control means engages the stopping portion of the second member, for controlling the rotation of the second member in relation to the first member in such a manner that, when the control means does not engage the stopping portion of the second member, the control means is rotated to engage either of the pair of bent portions of the locking coil member so that the locking coil member is loosened thereby to move along the male screw portion of the first member, whereby the second member and the control means move together in a given direction, and that, when the control means moves toward and engages the stopping portion of the second member, the second member engages either of the pair of bent portions of the locking coil member so that the locking coil member is tightly locked on the male screw portion of the first member, whereby the second member is prevented from further rotating, and thereafter the control means is moved in the direction opposite to the said given direction by a predetermined distance whereby a desired clearance is set between the members.

2. A device of claim 1, wherein the control means is a ring-like member made of a resilient material.

3. A device of claim 2, wherein the ring-like member is provided with a slit in its axial direction so that the ring-like member can be easily enlarged when the ring-like member is set onto the second member.

4. A device of claim 1 or 2, wherein the control means includes an inward projection of the inner side thereof, the inward projection being placed between the pair of bent portions of the locking coil member within the notch of the second member so that the inward projection can engage either of the pair of bent portions of the locking coil member when the control means does not engage the stopping portion of the second member.

5. A device of claim 1 or 2, wherein the control means includes an axial projection protruding axially from one end of the control means, the axial projection being adapted to engage the stopping portion of the second member in such a way that the second member engages either of the pair of bent portions of the locking coil so that the locking coil member is tightly locked on the male screw portion of the first member, whereby the second member is prevented from rotating.

6. A device of claim 5, wherein the axial projection of the control means has a length in its axial direction equal to a desired clearance to be set or adjusted so that, when the control means is moved in the direction opposite to the said given direction, the desired clearance is automatically set.

7. A device of claim 5, wherein the stopping portion of the second member is a flange-like portion formed at one end of the second member said flange-like portion having opposite ends between which the axial projection of the control means is to be inserted.

8. A device of claim 4, wherein the second member includes a collar portion at which the notch is formed.

9. A device of claim 8, wherein the notch is rectangular, the inward projection of the control means being movable in its axial and rotational directions in the notch within a limited range.

10. A device of claim 1, wherein the first member is an outer cable through which an inner cable is provided, the outer cable being fitted to a vehicle body, the inner cable being connected at its one end to a clutch pedal of a clutch system and at the other end to a withdrawal lever of the clutch system.

11. A device for adjusting a clearance between a certain member and another member, comprising:
   a first member having a male screw portion thereon;
   a second member having a female screw portion screwed with the male screw portion of the first member, and a notch formed in its axial direction;
   a locking coil member wound around the male screw portion of the first member, said locking coil member having a pair of outwardly bent portions set in the notch of the second member, the second member being engageable with the bent portions; and
   control means engageable with the bent portions and movable in rotational and axial directions in relation to the second member within a limited range for controlling the rotation of the second member in such a way that the locking coil member is loosened from, or tightly locked, on the male screw portion of the first member by selecting either the engagement of the control means, or the engagement of the second member, with one of the bent portions of the locking coil member, depending on a position of the control means relative to the second member.

* * * * *

UNITED STATES PATENT AND TRADEMARK OFFICE
CERTIFICATE OF CORRECTION

PATENT NO. : 4,326,617
DATED : April 27, 1982
INVENTOR(S) : Haruo Mochida et al

It is certified that error appears in the above—identified patent and that said Letters Patent is hereby corrected as shown below:

On the cover sheet assignee should read:

-- NISSAN MOTOR COMPANY, LIMITED and

NIPPON CABLE SYSTEM INC., both of Japan --

Signed and Sealed this

Ninth Day of November 1982

[SEAL]

Attest:

GERALD J. MOSSINGHOFF

Attesting Officer     Commissioner of Patents and Trademarks